United States Patent [19]
LaRosa et al.

[11] Patent Number: 5,255,292
[45] Date of Patent: Oct. 19, 1993

[54] METHOD AND APPARATUS FOR MODIFYING A DECISION-DIRECTED CLOCK RECOVERY SYSTEM

[75] Inventors: Christopher P. LaRosa, Lake Zurich; Michael J. Carney, Palatine, both of Ill.

[73] Assignee: Motorola, Inc., Schaumburg, Ill.

[21] Appl. No.: 858,821

[22] Filed: Mar. 27, 1992

[51] Int. Cl.$^5$ .................. H04L 7/00; H04L 25/36; H04L 25/40

[52] U.S. Cl. .................. 375/116; 375/108; 375/118

[58] Field of Search ............... 375/108, 114, 116, 118, 375/119, 106

[56] References Cited

U.S. PATENT DOCUMENTS

| | | |
|---|---|---|
| 4,012,598 | 3/1977 | Wiley . |
| 4,242,755 | 12/1980 | Gauzan . |
| 4,386,323 | 5/1983 | Jansen . |
| 4,667,333 | 5/1987 | Butcher . |
| 4,672,639 | 6/1987 | Tanabe et al. . |
| 4,821,297 | 4/1989 | Bergmann et al. . |
| 4,890,299 | 12/1989 | Dolivo et al. . |
| 4,953,185 | 8/1990 | Goode . |

Primary Examiner—Curtis Kuntz
Assistant Examiner—Duane Kogayashi
Attorney, Agent, or Firm—Kirk W. Dailey; Rolland R. Hackbart; John A. Fisher

[57] ABSTRACT

The present disclosure includes a discussion of a decision-directed clock recovery system which includes circuitry to prevent false-locking and accelerate acquisition on a known symbol patterns. The clock recovery system has at least two control circuits. Each control circuit has an effective bandwidth and also generates a clock signal. The clock recovery system samples the received data signal using the two clock signals, forming a corresponding first and second sampled signal. The sampled signals are used to generate corresponding symbol decisions. The symbol decision signals are processed to detect a known symbol pattern in the received data signal. Upon detection of the known bit sequence, the characteristics of the clock recovery system are modified, namely, the effective bandwidth of the control circuits are modified.

26 Claims, 6 Drawing Sheets

| TRANSMITTED DATA | ACQUISITION TIME WITHOUT FAST-ACQUISITION FEATURE (#SYMBOLS) | ACQUISITION TIME WITH FAST-ACQUISITION FEATURE (#SYMBOLS) |
|---|---|---|
| 1001 REPEATING BIT PATTERN | 44.0 | 17.4 |
| RANDOM DATA | 78.75 | 77.0 |

METHOD AND APPARATUS FOR MODIFYING A DECISION-DIRECTED CLOCK RECOVERY SYSTEM

FIELD OF THE INVENTION

This invention generally relates to clock recovery circuitry and more specifically to a method and apparatus for modifying a decision-directed clock recovery system to prevent false-locking and accelerate acquisition on a known symbol pattern.

BACKGROUND OF THE INVENTION

Recently in the field of radio frequency (RF) communications, there has been an increased demand for digitally encrypted voice and high speed data communications. Since the RF spectrum is inherently limited, one must devise a new system concept and organizational features to accommodate the increased demand. A time division multiple access (TDMA) system is one such system which offers more efficient spectrum utilization and increased capacity.

In its simplest form, a TDMA system is comprised of a transmitting base station, which is capable of time multiplexing messages from at least two users on a single RF channel, and one or more remote receiving stations capable of receiving at least one of the time multiplexed messages. Typically, the receiving station would be a mobile or portable radiotelephone capable of transmitting a TDMA message to the base station on a second RF channel.

In a TDMA system, like most digital communications systems, it is necessary to establish a reference clock in the receiving station that is continuously synchronized with the transmit clock to accurately recover the digital data transmitted between the two points. Continuous bit synchronization, as used herein, means that the frequency and phase of the received clock signal must accurately track that of the transmit clock.

Figure 1:
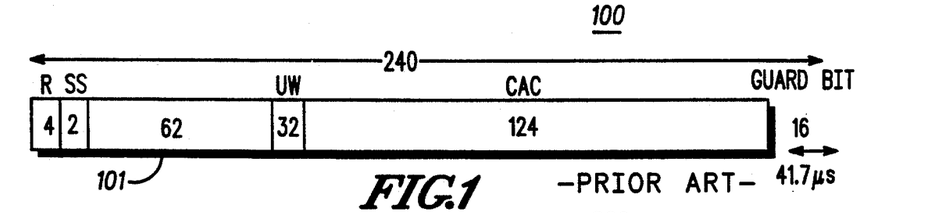
FIG. 1 is an illustration of a control time slot as used by the present invention.

One implementation of a TDMA system uses a time division duplex (TDD) slot structure. The TDD system uses one RF channel to send control and communication information between two points. FIG. 1 is an illustration of a control slot 100 for a particular application. This application requires that symbol synchronization for the control slots 100 be carried out independently for each slot. To aid in the synchronization a 62-bit preamble 101 is provided at the start of each slot 100. A conventional decision-directed clock recovery system would have two problems with this slot structure. First, the 62-bit (31-symbols for quadrature phase shift keying modulation) preamble 101 does not provide sufficient time for symbol timing acquisition. Second, the 62-bit preamble has false-lock points which can cause a decision-directed system to move toward an incorrect sampling phase. Thus, the conventional clock recovery approach for the control slots 100 would be to correlate the detected signal with the known bit pattern.

Figure 2:
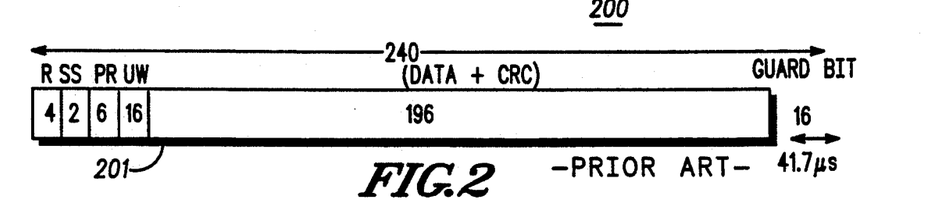
FIG. 2 is an illustration of a communications slot as used by the present invention.

FIG. 2 is an illustration of a communications slot 200 for a specific application. The communications slot 200 has an extremely short preamble pattern 201 of 6 bits. A correlator-based clock recovery system would not be appropriate for the communication slot 200 because it requires a longer preamble to lock onto the received data signal. As a result, the conventional solution to the clock recovery problem would be to use a correlation-based system for the control slots 100 and a decision-directed clock recovery scheme for the communications slots 200. However, two different system implementations would result in excessive power consumption, size and complexity.

A desirable system would be a unified solution to the symbol synchronization problem which does not require two distinct solutions, namely, a correlation based approach and a decision-directed approach.

SUMMARY OF THE INVENTION

The present invention encompasses a method of modifying a decision-directed clock recovery system to prevent false-locking and accelerate acquisition on a known symbol pattern. The clock recovery system has at least two control circuits. Each control circuit has an effective bandwidth and also generates a clock signal. The invention samples the received data signal using the two clock signals, forming a corresponding first and second sampled signal. The sampled signals are used to generate corresponding symbol decisions. The symbol decision signals are processed to detect a known symbol pattern in the received data signal. Upon detection of the known bit sequence, the characteristics of the clock recovery system are modified.

DESCRIPTION OF A PREFERRED EMBODIMENT

The preferred embodiment encompasses a digital receiver of a radiotelephone. The digital receiver includes a decision-directed clock recovery circuit for use in demodulating the received signal. The clock recovery circuitry is modified to have a decision-directed clock recovery mode and a preamble detection mode to allow for flexibility in acquiring synchronization between a received data signal and a clock recovered signal.

The present invention encompasses the preamble detection circuit and corresponding modification to the sampling phase adjustment circuit which controls the loop bandwidths of the control circuits. The preferred embodiment has four clock recovery control circuits, each corresponding to one of four clock signals. However, only two such circuits are required to gain the benefit of the present invention. When random data is detected, the circuit operates in the decision-directed mode. Upon detecting a known symbol pattern, the circuit enters the preamble detection mode. In this mode, a false-lock state detected in any one of the four control circuits sets the effective bandwidth of that control circuit to 0, freezing the clock recovery system from further phase adjustment. If a fast acquisition state is detected in the preamble detection mode, then the effective bandwidths of the control circuits are increased to 4 times their nominal bandwidths, providing quick adjustment to the desired phase of the received data signal.

Figure 3:
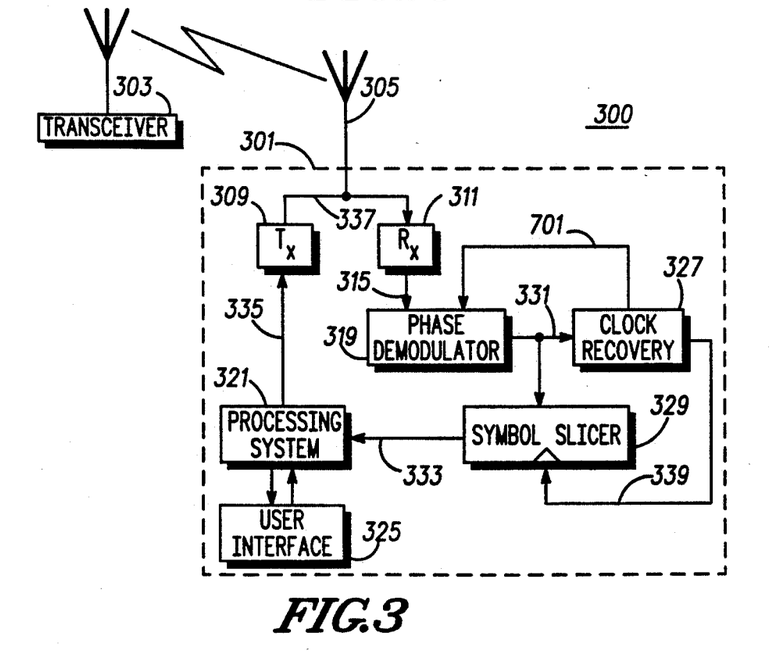
FIG. 3 is a block diagram of a radiotelephone communications system in accordance with the present invention.

FIG. 3 is a block diagram of a radiotelephone system which employs the present invention. In the radiotelephone system, the fixed site transceiver 303 sends and receives radio frequency (RF) signals to and from mobile and portable radiotelephones contained within a fixed geographic area. The radiotelephone 301 is one such radiotelephone served by the fixed site transceiver 303.

While receiving signals from the fixed site transceiver 303, the radiotelephone 301 uses the antenna 305 to couple the RF signal and to convert the RF signal into an electrical radio frequency signal 337. The electrical RF signal is received by the radio receiver 311 for use within the radiotelephone 301. The receiver 311 generates an intermediate frequency (IF) signal 315. This signal 315 is input into the phase demodulator 319. The phase demodulator 319 outputs a phase demodulated signal 331 for use by the clock recovery circuitry 327 and the symbol slicer 329. The clock recovery circuitry 327 outputs the symbol sampling clock 339 to the symbol slicer 329 and the non-uniform sampling clock 701 to the phase demodulator 319. The phase demodulator signal 331 is also used as the received data signal for the symbol slicer 329. The symbol slicer in turn outputs a symbol signal 333 for use by the processor 321. The processor 321 formats the symbol signal 333 into voice and/or data for the user interface 325. The user interface 325 contains a microphone, a speaker and a keypad.

Upon transmission of RF signals from the portable radiotelephone 301 to the fixed site transceiver 303, the voice and/or data signals from the user interface 325 are processed by the processor 321. The processed signals are input into the transmitter 309. The transmitter 309 converts the processed signals into electrical RF signals. The electrical RF signals are converted into RF signals and output by the antenna 575. The RF signals are received by the fixed site transceiver 303, which interfaces to the land-line telephone signals.

Figure 4:
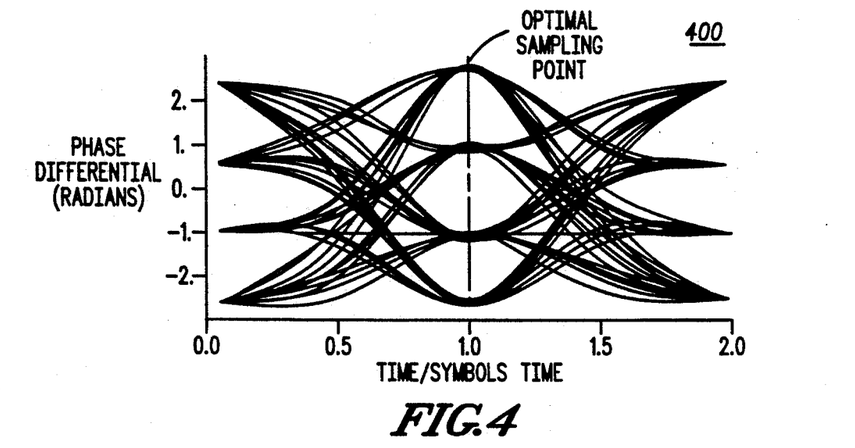
FIG. 4 is an eye diagram of $\pi/4$ QPSK data at the output of a differential detector.

FIG. 4 is an illustration of an eye diagram of a π/4 quadrature phase shift keying (QPSK) signal at the output of a differential detector contained within the phase demodulator 319. This signal is representative of the data output on the phase demodulated signal 331. For accurate recovery of the symbols transmitted between the transceiver 303 and the portable radiotelephone 301, the symbol sampling clock 339 should sample the received data signal 331 at or near the optimal sampling point as illustrated in FIG. 4. Sampling at points other than the optimal location can cause degraded bit error rate (BER) performance.

Figure 5:
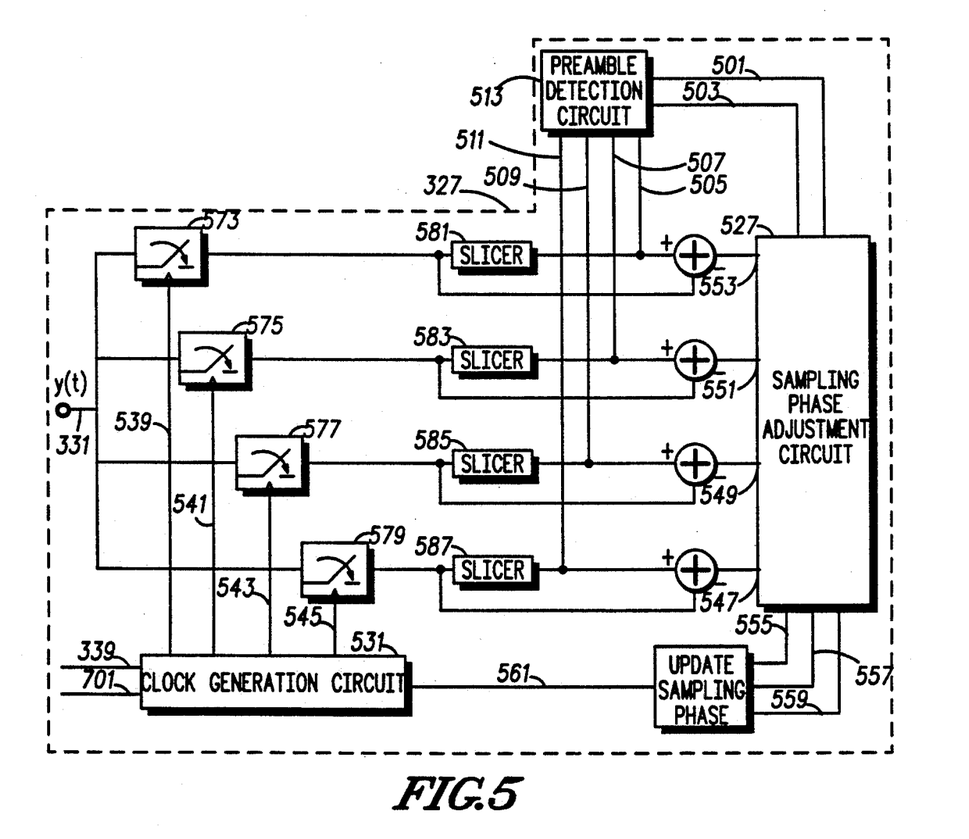
FIG. 5 is a block diagram of the clock recovery system in accordance with the present invention.

FIG. 5 is a detailed block diagram of the clock recovery circuitry 327 utilized in the preferred embodiment. The clock recovery circuitry uses the phase demodulator output signal y(t) 331 to recover the clock signals. In the preferred embodiment, the clock generation circuit 331 generates four individual clock signals 539, 541, 543, 545. These clocks are used to sample and hold the phase demodulator output signal y(t) 331. Other equally sufficient implementations of the present invention may generate two or more clock signals to perform the phase adjustments according to the present invention.

For purposes of description, the preferred embodiment has four individual control circuits. Each control circuit utilizes one of the four clock signals 539, 541, 543, 545 with the corresponding sample and hold circuits, 573, 575, 577, 579 and the corresponding slicers 581, 583, 585, 587. Each of the control circuits has an equivalent loop bandwidth which is determined by the sampling phase adjustment circuit 527.

Figure 6:
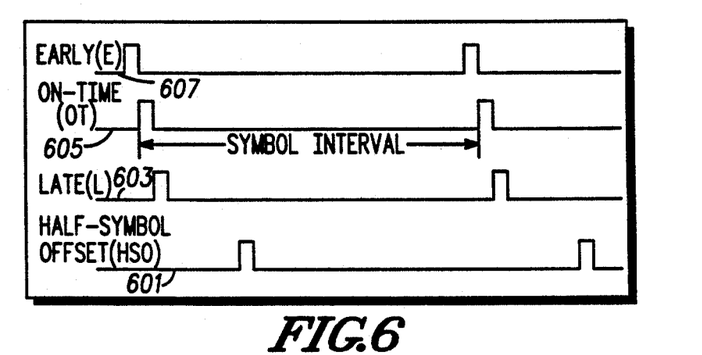
FIG. 6 is a diagram illustrating multiple phase offset clocks in accordance with the present invention.
Figure 7:
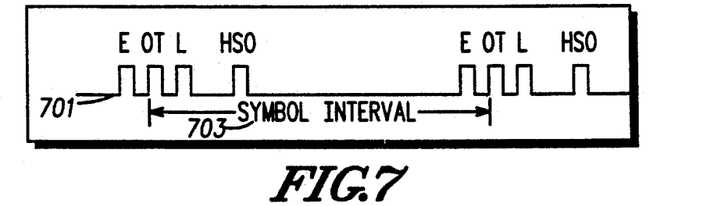
FIG. 7 is an example of a non-uniform sampling clock combining the individual clocks of FIG. 6 in accordance with the present invention.

The relative phases, as used in the preferred embodiment, of the four clock signals 539, 541, 543, 545 are shown in FIG. 6. The on-time signal 605 has a clock pulse once each symbol interval. The early clock signal 607 generates a clock pulse at intervals equal to the intervals of the on-time signal 605, but shifted in phase by ⅛ of a symbol time before the on-time signal 605. The late clock signal 603 is equal in frequency and shifted by ⅛ of a symbol interval later than the on-time signal 605. The half-symbol offset clock signal 601 is identical to the on-time signal in frequency and shifted by ½ a symbol interval. The non-uniform sampling clock 701 of FIG. 7 is used to sample the phase within the phase demodulator 319. It is formed by ORing the four individual clocks 601, 603, 605, and 607. Other equally sufficient implementations may be used by varying the phase offsets but are still considered within the essence of the invention disclosed herein.

These four clock signals 601, 603, 605, and 607 are used to sample the phase demodulator output signal 331 with the sample and hold circuits 573, 575, 577, 579. These sampled phases are then input into the slicer and adder combination to form error signals 547, 549, 551, 553. The error signal is formed by taking the difference between the sampled detector output signal and the nearest corresponding decision point, i.e., the slicer output.

The error signals 547, 549, 551, 553, are input into the sampling phase adjustment circuitry 527. The sampling phase adjustment circuit 527 is used to advance or retard the four symbol clocks to minimize the error at the on-time sampling point. At the output of the four slicers, 581, 583, 585, 587 is the symbol output signals 505, 507, 509, 511.

The preamble detection circuit 513 is utilized to detect the presence of the known symbol pattern, namely the 62-bit preamble 101 of the control slot 100. The permeable detection circuit is also utilized to detect potential false-lock points at each of the four clock phases. At the output of the preamble detection circuit 513 there is the fast acquisition enable control signal 501 and 4 false-lock inhibit control signals 503 which correspond to each of the 4 control circuits.

The preamble detection circuit 513 recognizes when the known bit pattern is being received and upon recognition, automatically alters the clock adjustment decision rules so as to prevent false-locking and accelerate adjustments toward the optimal sampling phase. The preamble detector circuit 513 examines the outputs of the 4 symbol slicers to determine whether or not the preamble pattern is being detected at any of the four sampling phases. The preamble detection circuit 513 then utilizes this information to generate the fast acquisition enable control signal 501 and the false-lock inhibit control signals 503.

Figure 8:
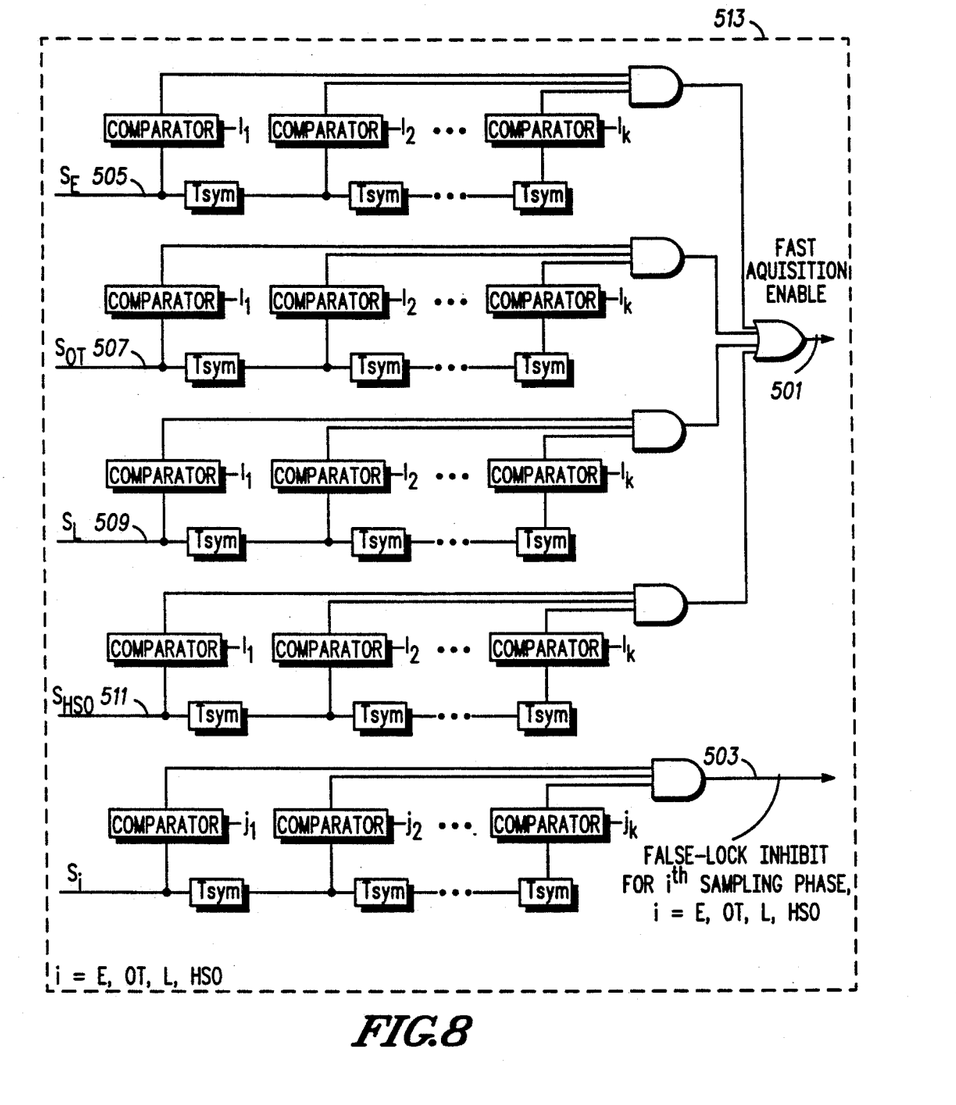
FIG. 8 is an example of a preamble detection circuit in accordance with the present invention.
Figure 9:
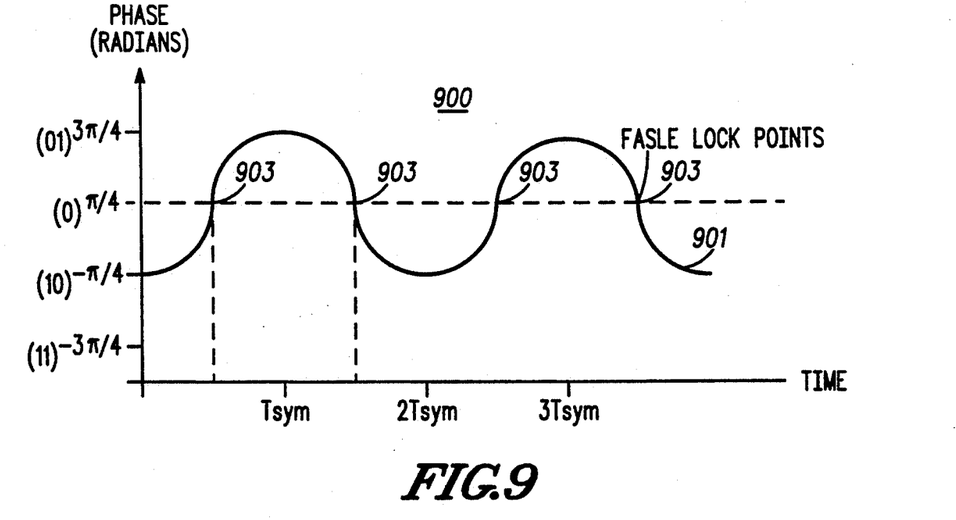
FIG. 9 is illustrates a known symbol sequence at the output of a differential phase demodulator in accordance with the present invention.

The preamble detection circuit 513 operates by detecting a portion of the preamble symbol sequence 101 and/or the corresponding false-lock symbol sequence at one or more of the four clock sampling phases. A generalized preamble detection circuit is illustrated in FIG. 8. This circuit will enable fast acquisition mode whenever the symbol pattern $I_1, I_2, \ldots, I_k$ is detected at any of the 4 sampling phases of the clock signal. This pattern can be a portion of the actual preamble sequence 101 or the corresponding false-lock pattern. The preamble detection circuit 513 will also determine which of the 4 sampling phases, if any, are currently detecting the false-lock pattern $J_1, J_2, \ldots J_k$. The preamble detection circuit does not necessarily need to detect the entire preamble sequence and/or corresponding false-lock symbol pattern. The number of stages in the preamble detection circuit (k) is selected to ensure a high probability of preamble false-lock detection during the known sequence while minimizing the probability of detection on random data. In the preferred embodiment, k is equal to 4. The fast acquisition enable control signal 501 and the 4 false-lock inhibit control signals 503 are then input into the sampling phase adjustment circuit 527.

The modification of the decision-directed clock recovery system occurs within the sampling phase adjustment circuit 527. The method of modification is illustrated in the process flow chart of FIG. 10. The process flow chart 1000 begins by monitoring the false-lock inhibit control signal 503 and the fast acquisition enable control signal 501, both of which have an active and an inactive state. The process flow chart 1000 illustrated in FIG. 10 operates on the portion of each of the four control circuits contained within the sampling phase adjustment circuit 527. At decision block 1003, the process flow chart 1000 determines if the false-lock inhibit signal 503 is active. If the false-lock inhibit control signal is active, the equivalent bandwidth of the control circuit is set equal to zero at the functional block 1007, effectively locking the corresponding clock recovery control circuit at its current phase. Upon detecting a false-lock inhibit signal in an inactive state at decision block 1003 the process continues to decision block 1005. At decision block 1005 the process determines if the fast acquisition enable control signal is active. If the fast acquisition enable control signal is active, then the equivalent bandwidth of the given control circuit is set equal to the fast acquisition bandwidth at functional block 1011. The fast acquisition bandwidth allows quick acquisition to the desired sampling phase. If at decision block 1005 it is determined that the fast acquisition enable control signal 501 is inactive, then the equivalent bandwidth of the given control circuit is set equal to a nominal value at functional block 1009.

Figure 12:
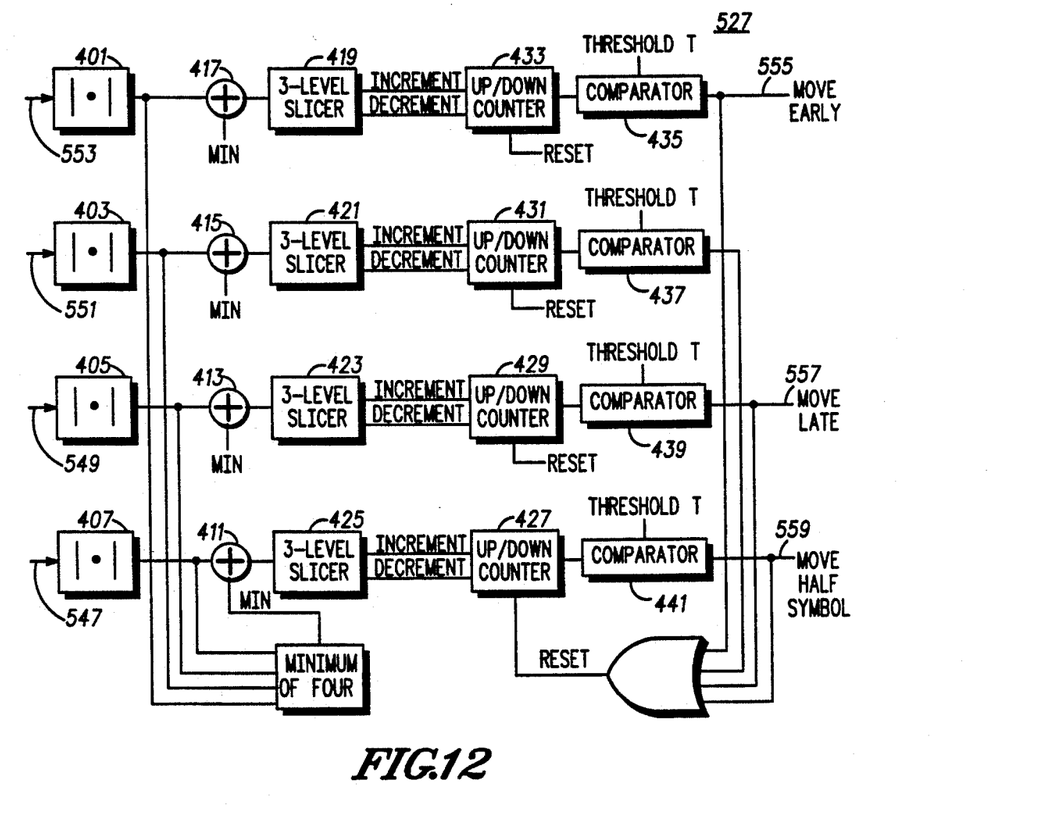
FIG. 12 is a detailed block diagram of a sampling phase adjustment circuit in accordance with the present invention.

FIG. 12 is a block diagram illustrating one possible implementation of the sampling phase adjustment circuits 527 illustrated in FIG. 5. The first function of the sampling phase adjustment circuit 527 is to determine the magnitude of each error signal 547, 549, 551, 553, within the blocks 401, 403, 405, 407. Next, the smallest error magnitude signal is selected and called the minimum error value. This minimum error value is subtracted from each of the four error signals 547, 549, 551, 553, resulting in four normalized error magnitude signals. A three-level decision is then made for each sampling phase as a function of how its error magnitude compares to the minimum error magnitude. If the error magnitude signal is sufficiently close to the minimum value, or the normalized error magnitude is less than a threshold $\Delta_1$, then the corresponding counter is incremented. If the error magnitude is large relative to the minimum value, or the normalized error magnitude is greater than a second threshold $\Delta_2$, then the corresponding counter is decremented. Finally, if the normalized error magnitude falls within the middle region, greater than the first threshold $\Delta_1$, and less than or equal to the second threshold $\Delta_2$, then the counter is held constant.

The first of the four counters 433, 431, 429, 427, to reach a predetermined positive threshold has demonstrated that its error magnitude is consistently smaller than that of the other three sampling phases; hence, the appropriate clock adjustment decision is then made. This carried out in the block diagram by having the output value of the counters input into the comparators 435, 437, 439 441. Here, the output values of the counters are compared to the predetermined threshold, T. If one of the counters reaches the threshold, then all of the counters 433, 431, 429, 427 are reset to zero, restarting the averaging process for the phase adjustment circuit. The reset function is implemented by ORing the outputs of the four comparators within the 4-input OR gate 443, which is then tied to the reset inputs of each of the four counters, 433, 431, 429, 427. The output of the first comparator 435 is equal to the move early phase adjustment signal 555. The output of the second comparator 437 is not tied to a shifting signal because the desired phase has already been obtained. The output of the third comparator 439 is the signal 557 of FIG. 5, which is a move late phase adjustment signal. The output of the fourth comparator 441 is the move half symbol phase adjustment signal 559.

Figure 10:
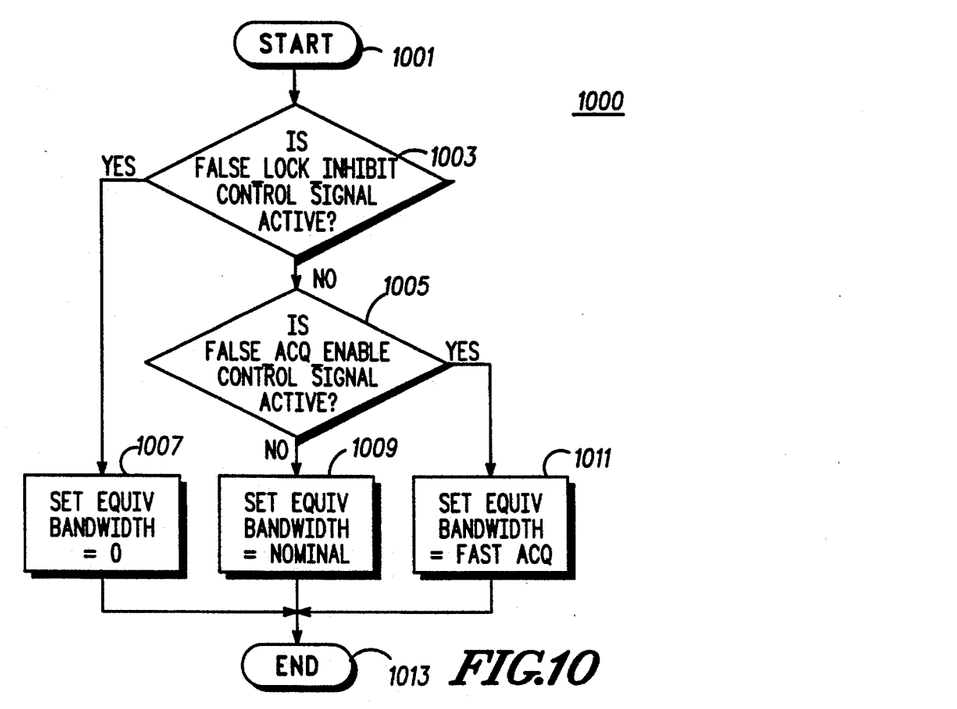
FIG. 10 is process flow chart illustrating the modification characteristics to the clock recovery circuitry in accordance with the present invention.

The modifications to control the bandwidths as illustrated by the process flow chart of FIG. 10 are implemented by modifying the incremental steps of the up/down counters 427, 429, 431, 433. Setting the effective bandwidth equal to zero as illustrated in functional block 1007 is equivalent to preventing a counter from incrementing. Setting the effective bandwidth to the fast acquisition bandwidth as illustrated in functional block 1011 is equivalent to increasing the incremental counter steps of the four up/down counters 427, 429, 431, 433 to m, where m is an integer greater than 1. In the preferred embodiment m is equal to 4. Setting the effective bandwidth to the nominal bandwidth as illustrated in functional block 1009 is equivalent to maintaining the incremental counter steps of the four up/down counters 427, 429, 431, 433 at the nominal value of 1.

Figure 11:
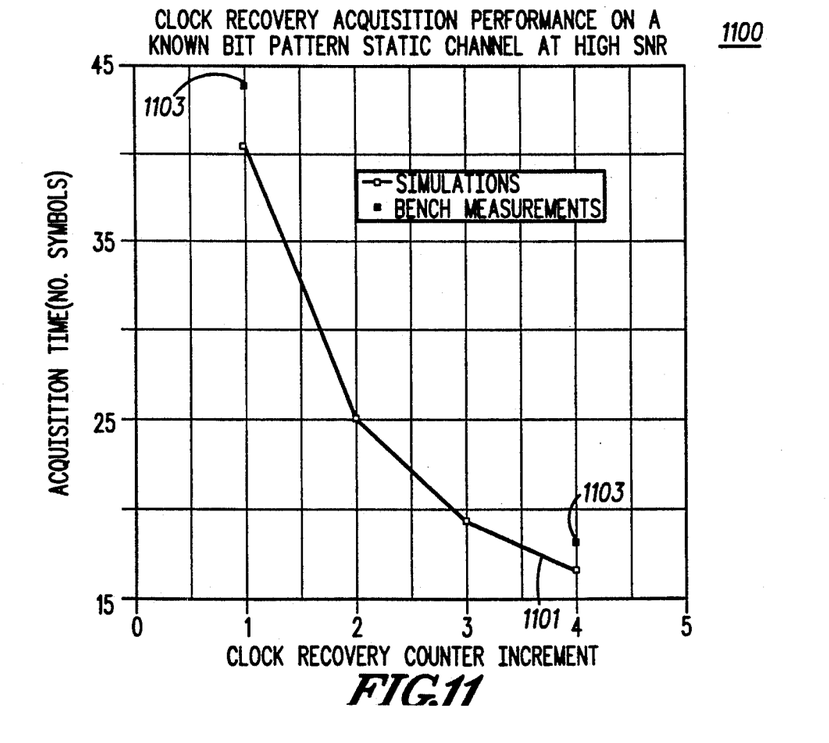
FIG. 11 is a graph representing the performance of the present invention.
Figure 13:
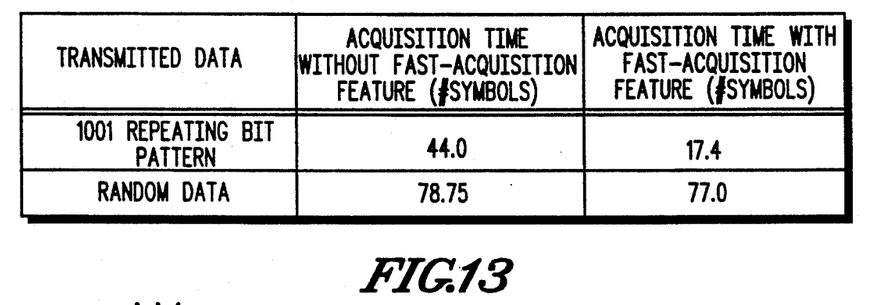
FIG. 13 is a table indicating performance of a clock recovery system in accordance with the present invention.

The invention described herein has been simulated and bench tested to verify its impact on acquisition performance in the given specified system. FIG. 11 plots acquisition time as a function of the up/down counter increment value m. This plot clearly illustrates that increasing the value of m reduces the time required to acquire symbol timing on the preamble pattern. In the preferred embodiment, the value of m equal to 4 has been selected; this value provides satisfactory acquisition performance without degrading steady state bit error rate (BER) performance on random data. As the results of FIG. 11 demonstrate the fast acquisition feature has reduced the acquisition time by about a factor of 3 for the known bit pattern. Moreover, this fast acquisition feature does not degrade acquisition performance for random data; this is demonstrated by the results of the table in FIG. 13. In addition to improved symbol timing acquisition performance, the invention also offers false-lock protection. The implementation of the preamble detection mechanism eliminated adjustments to a false-lock point for all measured bench trials.

What is claimed is:

1. A method of modifying characteristics of a decision-directed clock recovery system to prevent false-locking and accelerate acquisition on a known symbol pattern, the clock recovery system having a first and a second control circuit, and a first and second clock signal corresponding to the first and the second control circuit, the first and the second control circuit having an effective loop bandwidth, the method comprising the steps of:
   sampling a first received signal using said first and said second clock signals, and forming a corresponding first and second sampled signal;
   generating a first and a second symbol decision signal for said first and said second sampled signal;
   detecting, responsive to said first and said second symbol decision signals, a presence of a known symbol pattern in the first received signal; and
   modifying, responsive to said step of detecting, the characteristics of the clock recovery system.

2. A method of modifying in accordance with claim 1 wherein said step of detecting further comprises:
   a first step of comparing the first and the second symbol decision signals to a first selective portion of the known symbol pattern;
   a step of generating, responsive to said first step of comparing, a corresponding first and second false-lock inhibit control signal, each having an active and an inactive state;
   a second step of comparing the first and the second symbol decision signals to a second selective portion of the known symbol pattern; and
   a step of generating, responsive to said second step of comparing, a corresponding first and second fast acquisition enable control signal, each having an active and an inactive state.

3. A method of modifying in accordance with claim 2 wherein said step of modifying further comprises:
   a first step of detecting said active state of said first false-lock inhibit control signal;
   a step of setting, responsive to said first step of detecting, the first control circuit's effective loop bandwidth to a first predetermined value;
   a second step of detecting said active state of said second false-lock inhibit control signal; and
   a step of setting, responsive to said second step of detecting, the second control circuit's effective loop bandwidth to a first predetermined value.

4. A method of modifying in accordance with claim 3 wherein said step of modifying further comprises:
   a third step of detecting said inactive state of said first false-lock inhibit control signal and said inactive state of said first fast acquisition enable control signal;
   a step of setting, responsive to said third step of detecting, the first control circuit's effective loop bandwidth to a second predetermined value;
   a fourth step of detecting said inactive state of said second false-lock inhibit control signal and said inactive state of said second fast acquisition enable control signal; and
   a step of setting, responsive to said fourth step of detecting, the second control circuit's effective loop bandwidth to a second predetermined value.

5. A method of modifying in accordance with claim 4 wherein said step of modifying further comprises:
   a fifth step of detecting said inactive state of said first false-lock inhibit control signal and said active state of said first fast acquisition enable control signal;
   a step of setting, responsive to said fifth step of detecting, the first control circuit's effective loop bandwidth to a third predetermined value;
   a sixth step of detecting said inactive state of said second false-lock inhibit control signal and said active state of said second fast acquisition enable control signal; and
   a step of setting, responsive to said sixth step of detecting, the second control circuit's effective loop bandwidth to a third predetermined value.

6. A method of modifying in accordance with claim 5 wherein said third predetermined value is greater than said second predetermined value and said second predetermined value is greater than said first predetermined value.

7. A method of modifying in accordance with claim 1 wherein said step of detecting further comprises the steps of:
   comparing each of said at least first and second symbol decision signals to a first selective portion of the known symbol pattern; and
   generating, responsive to said step of comparing, a corresponding first and second false-lock inhibit control signal, each having an active and an inactive state.

8. A method of modifying in accordance with claim 7 wherein said step of modifying further comprises:
   a first step of detecting said active state of said first false-lock inhibit control signal;
   a step of setting, responsive to said first step of detecting, the first control circuit's effective loop bandwidth to a first predetermined value;
   a second step of detecting said active state of said second false-lock inhibit control signal; and
   a step of setting, responsive to said second step of detecting, the second control circuit's effective loop bandwidth to a first predetermined value.

9. A method of modifying in accordance with claim 8 wherein said step of modifying further comprises:
   a third step of detecting said inactive state of said first false-lock inhibit control signal;
   a step of setting, responsive to said third step of detecting, the first control circuit's effective loop bandwidth to a second predetermined value;
   a fourth step of detecting said inactive state of said second false-lock inhibit control signal; and
   a step of setting, responsive to said fourth step of detecting, the second control circuit's effective loop bandwidth to a second predetermined value.

10. A method of modifying in accordance with claim 9 wherein said second predetermined value is greater than said first predetermined value.

11. A method of modifying in accordance with claim 1 wherein said step of detecting further comprises the steps of:

comparing each of said at least first and second symbol decision signals to a first selective portion of the known symbol pattern; and generating, responsive to said step of comparing, a corresponding first and second fast acquisition enable control signal, each having an active and an inactive state.

12. A method of modifying in accordance with claim 11 wherein said step of modifying further comprises:

a first step of detecting said active state of said first fast acquisition enable control signal;

a step of setting, responsive to said first step of detecting, the first control circuit's effective loop bandwidth to a fourth predetermined value;

a second step of detecting said active state of said second fast acquisition enable control signal; and a step of setting, responsive to said second step of detecting, the second control circuit's effective loop bandwidth to a fourth predetermined value.

13. A method of modifying in accordance with claim 12 wherein said step of modifying further comprises:

a third step of detecting said inactive state of said first fast acquisition enable control signal;

a step of setting, responsive to said third step of detecting, the first control circuit's effective loop bandwidth to a fifth predetermined value;

a fourth step of detecting said inactive state of said second fast acquisition enable control signal; and a step of setting, responsive to said fourth step of detecting, the second control circuit's effective loop bandwidth to a fifth predetermined value.

14. A method of modifying in accordance with claim 13 wherein said fourth predetermined value is greater than said fifth predetermined value.

15. A decision-directed clock recovery apparatus for synchronizing a sampling clock signal to a received data signal, preventing false-locking and accelerating acquisition on a known symbol pattern, the apparatus including a first and a second control circuit, the control circuits generating a corresponding first and second clock signal and each control circuit having an effective loop bandwidth, the clock recovery apparatus comprising:

means for sampling a first received signal using the first and the second clock signals, forming a corresponding first and second sampled signal;

means for generating a first and a second symbol decision signal for said first and said second sampled signal;

means for detecting, responsive to said first and said second symbol decision signals, a presence of a known symbol pattern in the first received signal; and means for modifying, responsive to said means for detecting, the effective loop bandwidth of each control circuit.

16. A decision-directed clock recovery apparatus in accordance with claim 15 wherein said means for detecting further comprises:

first means for comparing the first and the second symbol decision signals to a first selective portion of the known symbol pattern;

means for generating, responsive to said first means for comparing, a corresponding first and second false-lock inhibit control signal, each having an active and an inactive state;

second means for comparing the first and the second symbol decision signals to a second selective portion of the known symbol pattern; and means for generating, responsive to said second means for comparing, a corresponding first and second fast acquisition enable control signal, each having an active and an inactive state.

17. A decision-directed clock recovery apparatus in accordance with claim 16 wherein said means for modifying further comprises:

first means for detecting said active state of said first false-lock inhibit control signal;

means for setting, responsive to said first means for detecting, the first control circuit's effective loop bandwidth to a first predetermined value;

second means for detecting said active state of said second false-lock inhibit control signal; and means for setting, responsive to said second means for detecting, the second control circuit's effective loop bandwidth to a first predetermined value.

18. A decision-directed clock recovery apparatus in accordance with claim 17 wherein said means for modifying further comprises:

third means for detecting said inactive state of said first false-lock inhibit control signal and said inactive state of said first fast acquisition enable control signal;

means for setting, responsive to said third means for detecting, the first control circuit's effective loop bandwidth to a second predetermined value;

fourth means for detecting said inactive state of said second false-lock inhibit control signal and said inactive state of said second fast acquisition enable control signal; and means for setting, responsive to said fourth means for detecting, the second control circuit's effective loop bandwidth to a second predetermined value.

19. A decision-directed clock recovery apparatus in accordance with claim 18 wherein said means for modifying further comprises:

fifth means for detecting said inactive state of said first false-lock inhibit control signal and said active state of said first fast acquisition enable control signal;

means for setting, responsive to said fifth means for detecting, the first control circuit's effective loop bandwidth to a third predetermined value;

sixth means for detecting said inactive state of said second false-lock inhibit control signal and said active state of said second fast acquisition enable control signal; and means for setting, responsive to said sixth means for detecting, the second control circuit's effective loop bandwidth to a third predetermined value.

20. A decision-directed clock recovery apparatus in accordance with claim 19 wherein said third predetermined value is greater than said second predetermined value and said second predetermined value is greater than said first predetermined value.

21. A radiotelephone including a receiver and a first and a second control circuit, the control circuits generating a corresponding first and second clock signal and each control circuit having an effective loop bandwidth, the receiver capable of receiving a first data signal, the first data signal having a phase, the radiotelephone comprising:

means for sampling the first data signal using the first and the second clock signals, and forming a corresponding first and second sampled signals;

means for generating a first and a second symbol decision signal for said first and said second sampled signal;

means for detecting, responsive to said first and said second symbol decision signals, a presence of a known symbol pattern in the first data signal; and means for modifying, responsive to said means for detecting, the effective loop bandwidth of the control circuits.

22. A radiotelephone in accordance with claim 21 wherein said means for detecting further comprises:

first means for comparing the first and the second symbol decision signals to a first selective portion of the known symbol pattern;

means for generating, responsive to said first means for comparing, a corresponding first and second false-lock inhibit control signal, the first and the second false-lock inhibit control signal having an active and an inactive state;

second means for comparing the first and the second symbol decision signals to a second selective portion of the known symbol pattern; and means for generating, responsive to said second means for comparing, a corresponding first and second fast acquisition enable control signal, the first and the second fast acquisition enable control signal having an active and an inactive state.

23. A radiotelephone in accordance with claim 22 wherein said means for modifying further comprises:

first means for detecting said active state of said first false-lock inhibit control signal;

means for setting, responsive to said first means for detecting, the first control circuit's effective loop bandwidth to a first predetermined value;

second means for detecting said active state of said second false-lock inhibit control signal; and means for setting, responsive to said second means for detecting, the second control circuit's effective loop bandwidth to a first predetermined value.

24. A radiotelephone in accordance with claim 23 wherein said means for modifying further comprises:

third means for detecting said inactive state of said first false-lock inhibit control signal and said inactive state of said first fast acquisition enable control signal;

means for setting, responsive to said third means for detecting, the first control circuit's effective loop bandwidth to a second predetermined value;

fourth means for detecting said inactive state of said second false-lock inhibit control signal and said inactive state of said second fast acquisition enable control signal; and means for setting, responsive to said fourth means for detecting, the second control circuit's effective loop bandwidth to a second predetermined value.

25. A radiotelephone in accordance with claim 24 wherein said means for modifying further comprises:

fifth means for detecting said inactive state of said first false-lock inhibit control signal and said active state of said first fast acquisition enable control signal;

means for setting, responsive to said fifth means for detecting, the first control circuit's effective loop bandwidth to a third predetermined value;

sixth means for detecting said inactive state of said second false-lock inhibit control signal and said active state of said second fast acquisition enable control signal; and means for setting, responsive to said sixth means for detecting, the second control circuit's effective loop bandwidth to a third predetermined value.

26. A radiotelephone in accordance with claim 25 wherein said third predetermined value is greater than said second predetermined value and said second predetermined value is greater than said first predetermined value.

* * * * *